US009545163B2

(12) United States Patent
Huang et al.

(10) Patent No.: US 9,545,163 B2
(45) Date of Patent: *Jan. 17, 2017

(54) PATTERNED FABRIC WITH AN IMAGE PATTERN

(71) Applicants: Chen-Cheng Huang, Taipei (TW); Pao-Hao Huang, Taipei (TW); Pao-Han Huang, Taipei (TW)

(72) Inventors: Chen-Cheng Huang, Taipei (TW); Pao-Hao Huang, Taipei (TW); Pao-Han Huang, Taipei (TW)

( * ) Notice: Subject to any disclaimer, the term of this patent is extended or adjusted under 35 U.S.C. 154(b) by 440 days.

This patent is subject to a terminal disclaimer.

(21) Appl. No.: 13/867,340

(22) Filed: Apr. 22, 2013

(65) Prior Publication Data

US 2013/0280482 A1    Oct. 24, 2013

(30) Foreign Application Priority Data

Apr. 23, 2012   (TW) .............................. 101114355 A (51) Int. Cl.

| B32B 3/24 | (2006.01) |
|---|---|
| A47G 5/00 | (2006.01) |
| D06Q 1/00 | (2006.01) |
| E06B 9/52 | (2006.01) |
| B32B 5/02 | (2006.01) |
| B32B 7/04 | (2006.01) |
| B32B 27/12 | (2006.01) |
| B32B 3/26 | (2006.01) |

(52) U.S. Cl.
CPC ................ *A47G 5/00* (2013.01); *B32B 3/266* (2013.01); *B32B 5/024* (2013.01); *B32B 5/028* (2013.01); *B32B 7/045* (2013.01); *B32B 27/12* (2013.01); *D06Q 1/00* (2013.01); *E06B 9/52* (2013.01); *B32B 2307/75* (2013.01); *Y10T 428/24289* (2015.01); *Y10T 428/24785* (2015.01)

(58) Field of Classification Search
CPC ............... D06Q 1/00; Y10T 428/24785; Y10T 428/24289
USPC ................................................ 428/133, 166
See application file for complete search history.

(56) References Cited

U.S. PATENT DOCUMENTS

| 4,312,690 | A | * | 1/1982 | Wheeler ........................ 156/253 |
| 4,351,871 | A | * | 9/1982 | Lewis et al. .................. 428/32.6 |
| 2013/0276996 | A1 | * | 10/2013 | Huang et al. .................. 160/330 |

* cited by examiner

*Primary Examiner* — William P Watkins, III
(74) *Attorney, Agent, or Firm* — LeClairRyan (57) ABSTRACT

A patterned fabric with an image pattern includes: a fabric sheet having opposite first and second surfaces and a plurality of pores extending through the first and second surfaces, each of the pores being defined by a pore-defining wall; and a plastic film bonded to the first surface of the fabric sheet and having opposite first and second faces and an image pattern formed on the first face. The plastic film is perforated to form a plurality of through-holes extending through the first and second faces. Each of the through-holes is defined by a hole-defining wall. The hole-defining wall of each of the through-holes extends into a respective one of the pores and wraps around and is bonded to at least a portion of the pore-defining wall of the respective one of the pores.

4 Claims, 10 Drawing Sheets

PATTERNED FABRIC WITH AN IMAGE PATTERN

CROSS-REFERENCE TO RELATED APPLICATION

This application claims priority of Taiwanese application no. 101114355, filed on Apr. 23, 2012.

BACKGROUND OF THE INVENTION

1. Field of the Invention

This invention relates to a patterned fabric with an image pattern, more particularly to a patterned fabric including a fabric sheet and a perforated plastic film bonded to the fabric sheet and having an image pattern.

2. Description of the Related Art

Fabrics can be used for applications, such as garments, curtains, sofas, chairs, shoes, luggages, backpacks, etc., and are commonly interwoven, dyed or printed with an image pattern for attracting attention of consumers.

U.S. Pat. No. 5,847,740 discloses a method of making an ink-printing cloth that includes the steps of preparing a cloth with a water content of 10 to 110%, pretreating the cloth for subsequent processing, applying an ink to the cloth, subjecting the cloth to a dyeing treatment, and washing the cloth so as to form an image pattern on the cloth.

Figure 1:
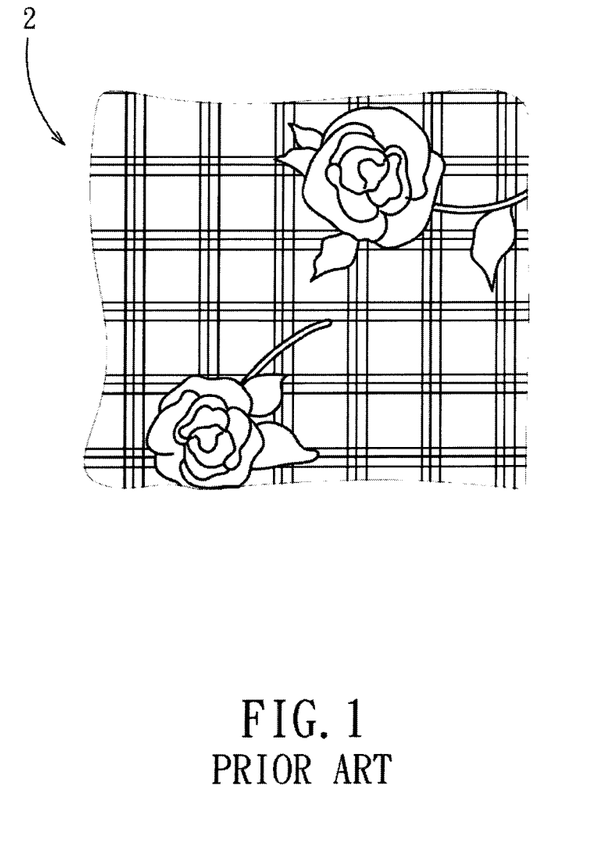
FIG. 1 is a schematic view of a conventional patterned fabric with an image pattern.

U.S. Patent Application Publication No. 2009/0061173 discloses a method of making a fabric 2 with a colored pattern (see FIG. 1) that includes the steps of providing a fabric having a manmade fiber layer and a natural fiber layer, providing a printing board for each color, printing a desired colored pattern on a printing area of the fabric using a corresponding printing board, printing an etching agent on another area of the fabric, and etching the area that is printed with the etching agent so as to form the colored pattern on the fabric 2.

The aforementioned conventional methods are complicate and the fabrics thus formed are expensive.

SUMMARY OF THE INVENTION

Therefore, an object of the present invention is to provide a patterned fabric that can overcome the aforesaid drawbacks associated with the prior art.

Another object of the present invention is to provide a method of making the patterned fabric.

According to one aspect of this invention, there is provided a patterned fabric with an image pattern. The patterned fabric includes: a fabric sheet having opposite first and second surfaces and a plurality of pores extending through the first and second surfaces, each of the pores being defined by a pore-defining wall; and a plastic film bonded to the first surface of the fabric sheet and having opposite first and second faces and an image pattern formed on the first face. The plastic film is perforated to form a plurality of through-holes extending through the first and second faces. Each of the through-holes is defined by a hole-defining wall. The hole-defining wall of each of the through-holes extends into a respective one of the pores and wraps around and is bonded to at least a portion of the pore-defining wall of the respective one of the pores.

According to another aspect of this invention, there is provided a method of making a patterned fabric with an image pattern. The method includes: (a) stacking a fabric sheet on a screen mold, the fabric sheet having opposite first and second surfaces and a plurality of pores extending through the first and second surfaces, each of the pores being defined by a pore-defining wall; (b) stacking a plastic film, which is printed with an image pattern, on the fabric sheet on the screen mold; (c) heating and softening the plastic film on the fabric sheet after step (b); (d) perforating the plastic film through vacuum perforation techniques using a suctioning device after step (c) so as to form a plurality of through-holes in the plastic film and a plurality of hole-defining walls, which define the through-holes, which extend into the pores, and which wrap around and are melt bonded to the pore-defining walls of the pores, respectively, thereby forming a patterned fabric on the screen mold; and (e) cooling and removing the patterned fabric from the screen mold.

BRIEF DESCRIPTION OF THE DRAWINGS

In drawings which illustrate embodiments of the invention.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 2:
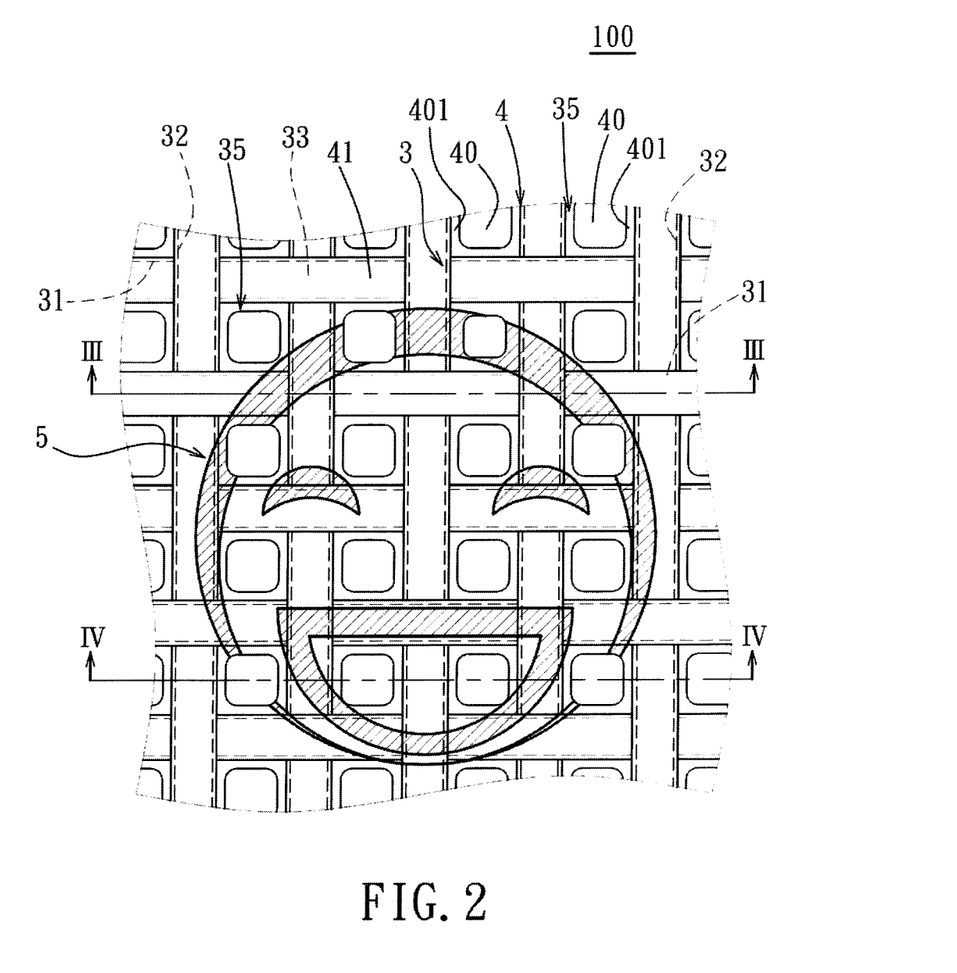
FIG. 2 is a schematic top view of the first preferred embodiment of a patterned fabric according to the present invention.
Figure 3:
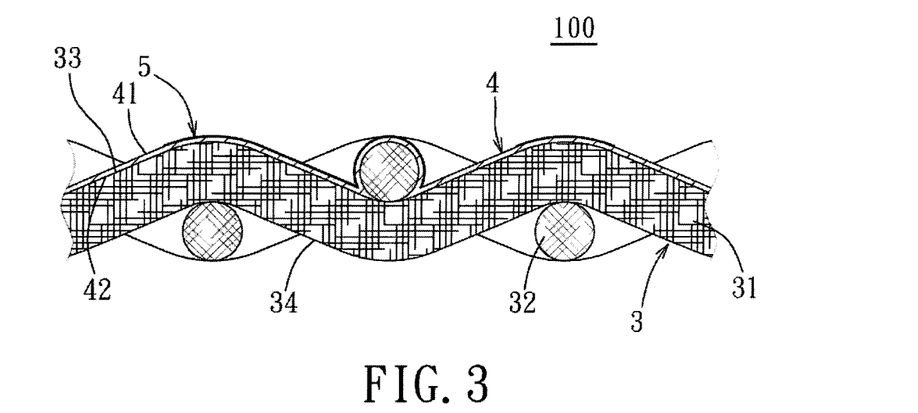
FIG. 3 is a sectional view taken along lines III-III in FIG. 2
Figure 4:
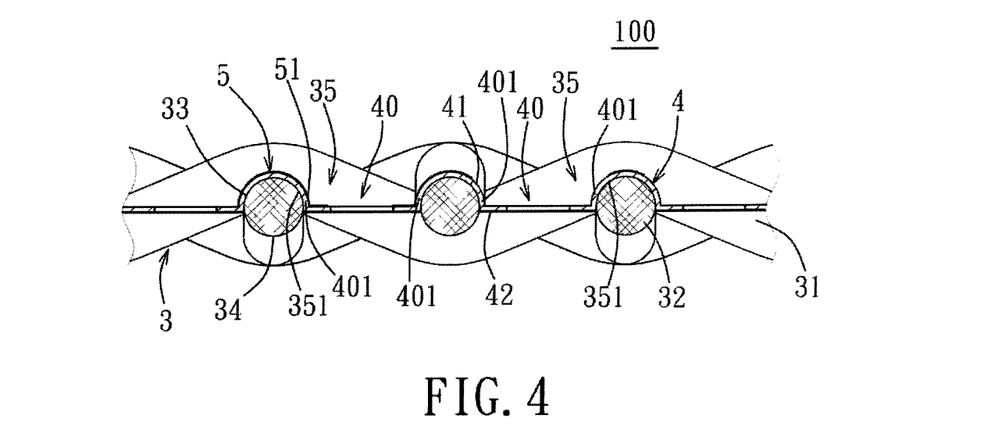
FIG. 4 is a sectional view taken along lines IV-IV in FIG. 2.

FIGS. 2 to 4 illustrate the first preferred embodiment of a patterned fabric 100 according to the present invention. The patterned fabric 100 has front and back sides, and includes: a fabric sheet 3 having opposite first and second surfaces 33, 34 that respectively correspond to the front and back sides of the patterned fabric 100, and a plurality of pores 35 extending through the first and second surfaces 33, 34, each of the pores 35 being defined by a pore-defining wall 351; and a plastic film 4 bonded to the first surface 33 of the fabric sheet 3 and having opposite first and second faces 41, 42 and an image pattern 5 formed on the first face 41 so that the image pattern 5 can be seen from the front side of the patterned fabric 100. The plastic film 4 is perforated to form a plurality of through-holes 40 extending through the first and second faces 41, 42. Each of the through-holes 40 is defined by a hole-defining wall 401. The hole-defining wall 401 of each of the through-holes 40 extends into a respective one of the pores 35 and wraps around and is bonded to a portion of the pore-defining wall 351 of the respective one of the pores 35.

The fabric sheet 3 is in the form of a woven fabric having warp yarns and weft yarns 31, 32 that are interlaced to form the pores 35. Alternatively, the fabric sheet 3 can be a non-woven fabric (not shown) having a plurality of fibers bonded together.

Preferably, at least a portion 51 of the image pattern 5 (see FIG. 4) extends into adjacent ones of the pores 35, and is disposed on the corresponding pore-defining walls 351, thereby permitting viewing of the portion 51 of the image pattern 5 at an inclined angle relative to the first surface 33 of the fabric sheet 3.

Preferably, the pores 35 in the fabric sheet 3 have a diameter ranging from 70 μm to 2 cm.

The image pattern 5 is made from an ink material printed on the plastic film 4 through conventional ink printing techniques.

Preferably, the plastic film 4 is made from a thermoplastic material selected from the group consisting of polyolefins, polyesters and thermoplastic elastomers.

Preferably, the plastic film 4 has a thickness ranging from 15 μm to 70 μm.

Figure 5:
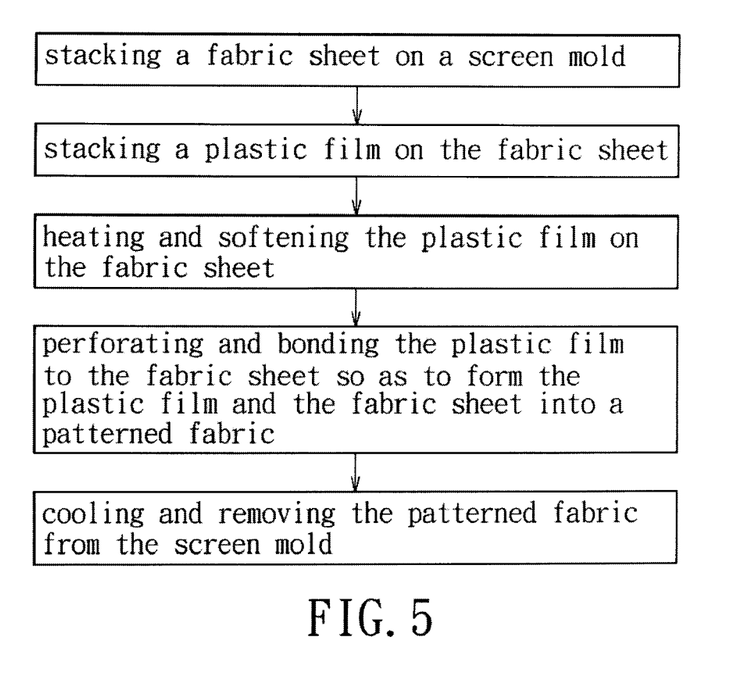
FIG. 5 is a flow chart illustrating consecutive steps of a method of making a patterned fabric with an image pattern according to the present invention.
Figure 6:
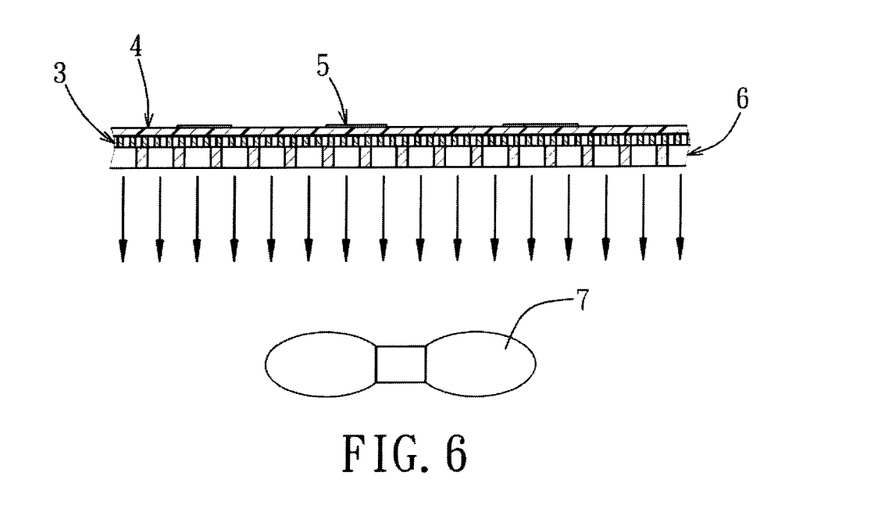
FIG. 6 is a schematic view illustrating how a plastic film is perforated and bonded to a fabric sheet on a screen mold using a suctioning device according to the method of the present invention.

FIG. 5, in combination with FIG. 6, illustrates consecutive steps of a method of making the first preferred embodiment. The method includes the steps of: (a) stacking the fabric sheet 3 on a screen mold 6; (b) stacking the plastic film 4, which is printed with the image pattern 5, on the fabric sheet 3 on the screen mold 6; (c) heating and softening the plastic film 4 on the fabric sheet 3 after step (b); (d) perforating the plastic film 4 through vacuum perforation techniques using a suctioning device 7 after step (c) so as to form the through-holes 40 in the plastic film 4 and permit melt bonding of the plastic film 4 to the fabric sheet 3, thereby forming the patterned fabric 100 on the screen mold 6; and (e) cooling and removing the patterned fabric 100 from the screen mold 6. The fabric sheet 3 is made from a material having a melting point higher than that of the thermoplastic material of the plastic film 4.

The printing of the image pattern 5 on the plastic film 4 can be accomplished using conventional printing techniques. Since the printing technology on a plastic film is well developed, the method of the present invention for forming the image pattern 5 on the fabric sheet 3 becomes relatively simple and easy. In addition, high resolution of the image pattern 5 on the fabric sheet 3 can be easily realized. Furthermore, mass production of the patterned fabric 100 of the present invention can be easily achieved.

Figure 7:
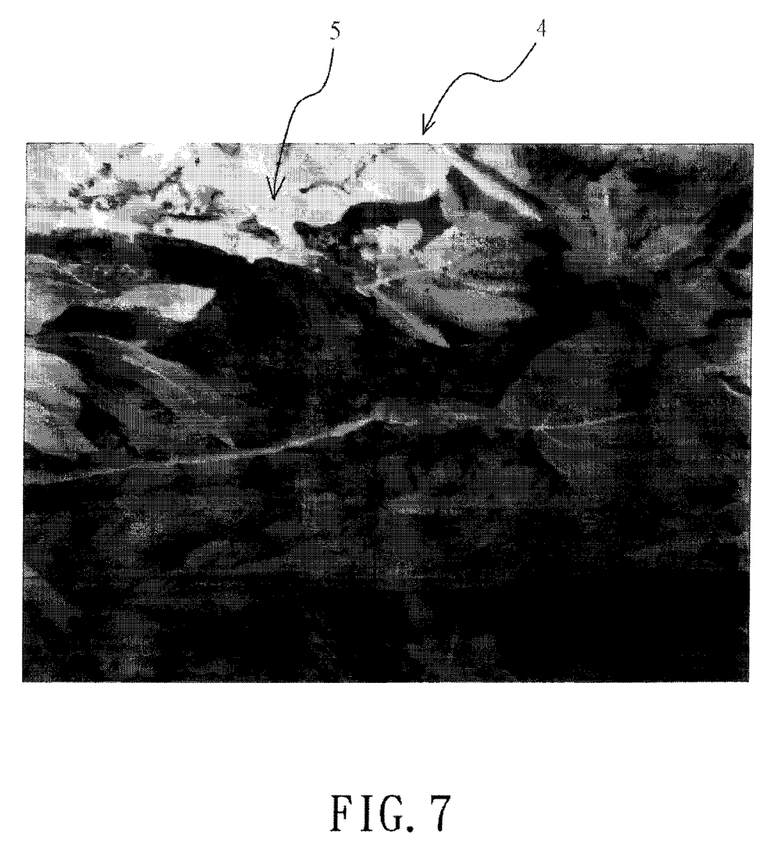
FIG. 7 is a picture showing a plastic film printed with an image pattern, which is used in the method of making an embodiment of the patterned fabric of the present invention.
Figure 8:
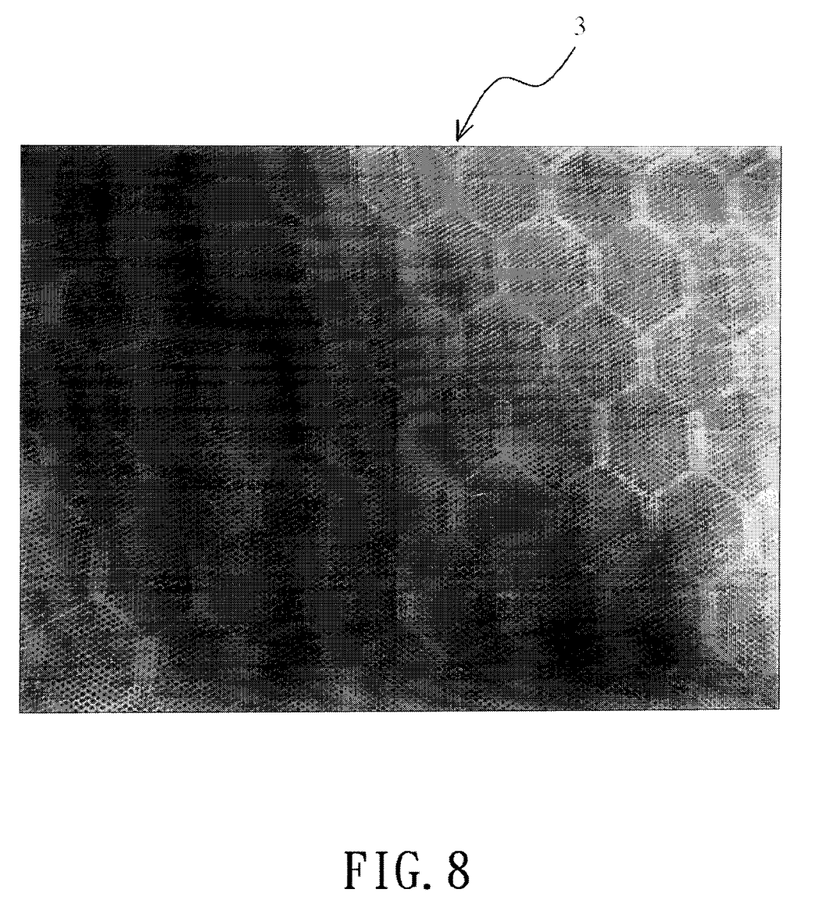
FIG. 8 is a picture showing a fabric sheet, which is used in the method of making the embodiment of the patterned fabric of the present invention.
Figure 9:
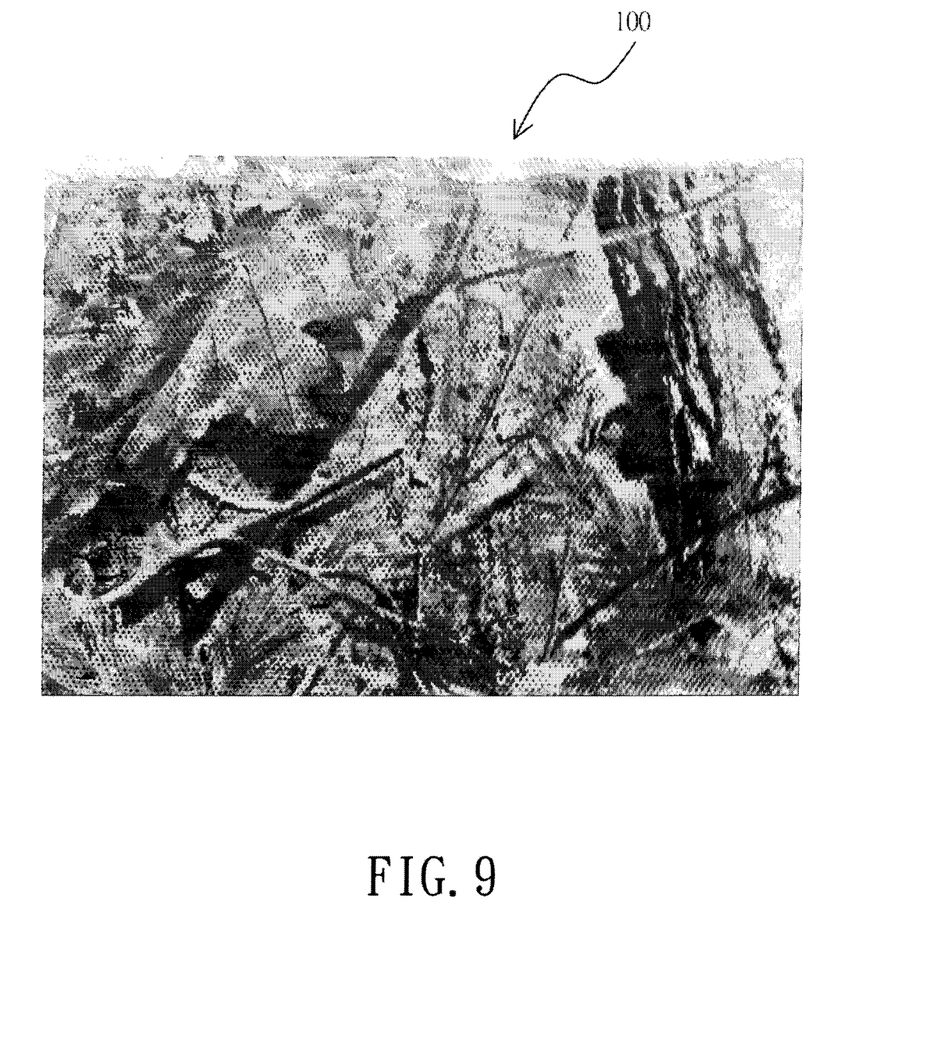
FIG. 9 is a picture showing a front side of the embodiment of the patterned fabric of the present invention.
Figure 10:
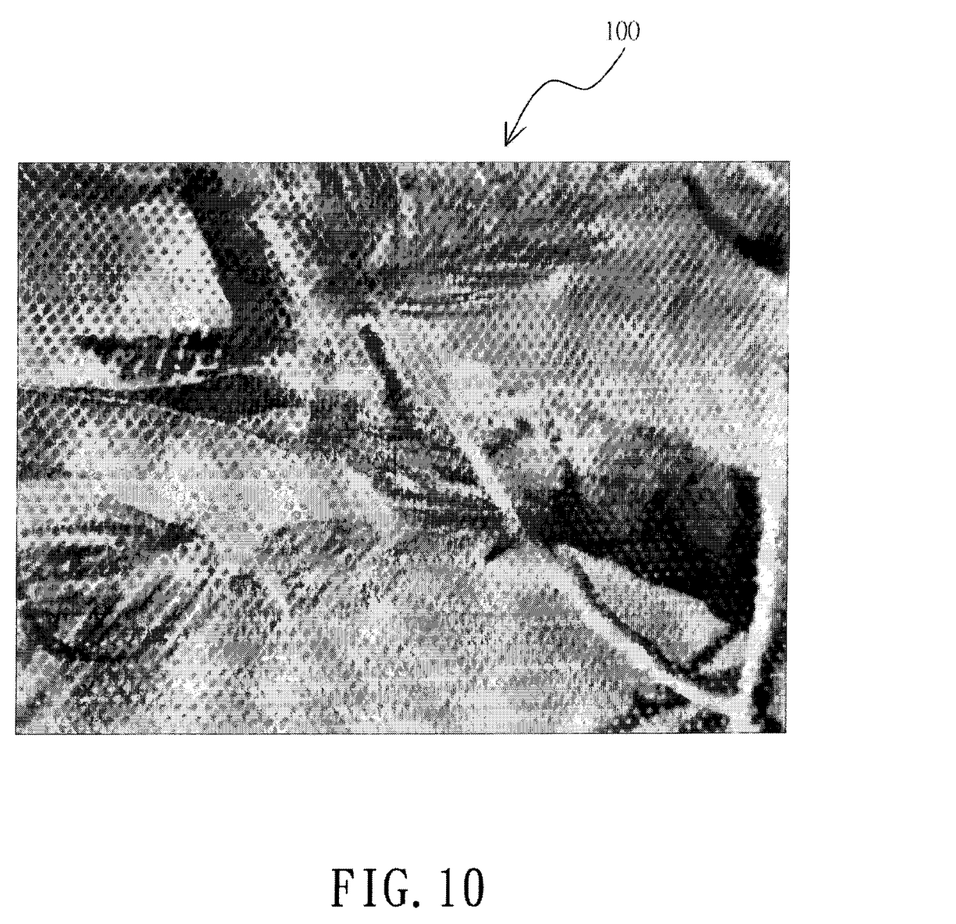
FIG. 10 is an enlarged picture of a portion of the patterned fabric of FIG. 9.

FIGS. 7 and 8 show the plastic film 4 printed with the image pattern 5 and the fabric sheet 3, respectively, before perforating the plastic film 4 and bonding of the plastic film 4 to the fabric sheet 3 to form an embodiment of the patterned fabric 100. FIG. 9 shows the front side of the embodiment of the patterned fabric 100 made from the plastic film 4 of FIG. 7 and the fabric sheet 3 of FIG. 8. FIG. 10 shows a portion of the patterned fabric 100 of FIG. 9.

Figure 11:
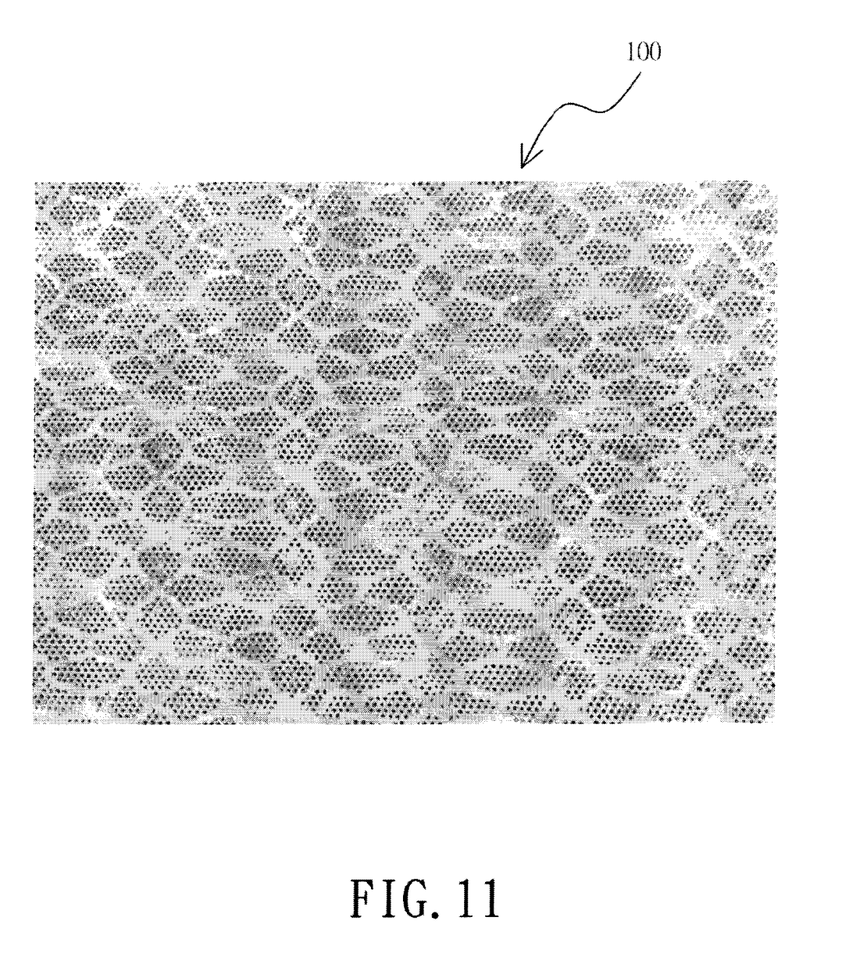
FIG. 11 is a picture showing a back side of the embodiment of the patterned fabric of the present invention.

FIG. 11 shows the back side of the embodiment of the patterned fabric 100 made from the plastic film 4 of FIG. 7 and the fabric sheet 3 of FIG. 8. It is noted that the plastic film 4 has a first non-perforated pattern corresponding to a texture pattern of the fabric sheet 3, and a second non-perforated pattern corresponding to a texture pattern of the screen mold 6 used for forming the through-holes 40 in the plastic film 4.

Figure 12:
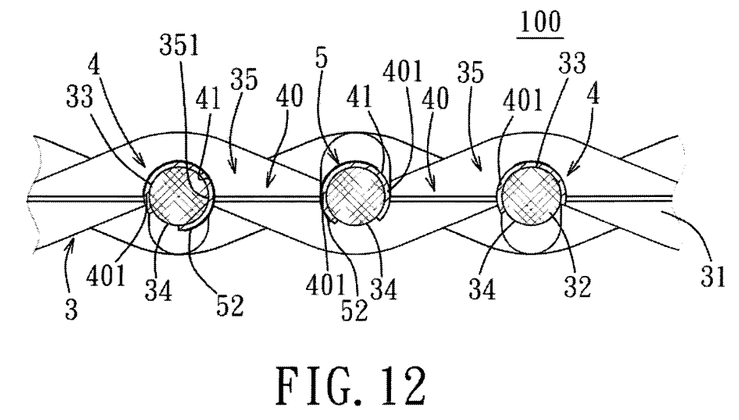
FIG. 12 is a sectional view of the second preferred embodiment of the patterned fabric according to the present invention.

FIG. 12 illustrates the second preferred embodiment of the patterned fabric 100 according to the present invention. The second preferred embodiment differs from the previous embodiment in that the hole-defining wall 401 of each of the through-holes 40 further extends through the respective one of the pores 35, and further wraps around and is bonded to a portion of the second surface 34 of the fabric sheet 3. In this embodiment, at least a portion 52 of the image pattern 5 extends through adjacent ones of the pores 35, and is disposed on the portion of the second surface 34 of the fabric sheet 3, thereby permitting viewing of the portion 52 of the image pattern 5 from the back side of the patterned fabric 100.

With the inclusion of the plastic film 4, that has the image pattern 5 and that is bonded to the fabric sheet 3, in the patterned fabric 100 of the present invention, the aforesaid drawbacks associated with the prior art can be eliminated.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A patterned fabric with an image pattern, comprising:
   a fabric sheet having opposite first and second surfaces and a plurality of pores extending through said first and second surfaces, each of said pores being defined by a pore-defining wall; and
   a plastic film bonded to said first surface of said fabric sheet and having opposite first and second faces and an image pattern formed on said first face, said plastic film being perforated to form a plurality of through-holes extending through said first and second faces, each of said through-holes being defined by a hole-defining wall;
   wherein said hole-defining wall of each of said through-holes extends into and through a respective one of said pores, and wraps around and is bonded to at least a portion of said pore-defining wall of the respective one of said pores and a portion of said second surface of said fabric sheet, at least a portion of said image pattern extending through adjacent ones of said pores and being disposed on said portion of said second surface of said fabric sheet.

2. The patterned fabric of claim 1, wherein said fabric sheet is in the form of a woven fabric or a non-woven fabric.

3. The patterned fabric of claim 1, wherein said image pattern is made from an ink material printed on said plastic film.

4. The patterned fabric of claim 1, wherein said plastic film is made from a thermoplastic material selected from the group consisting of polyolefins, polyesters and thermoplastic elastomers.

\* \* \* \* \*